United States Patent [19]

Shimbo et al.

[11] Patent Number: 6,105,892
[45] Date of Patent: Aug. 22, 2000

[54] AUTOREVERSE MECHANISM

[75] Inventors: Takaichi Shimbo; Masayuki Goto, both of Tokyo, Japan

[73] Assignee: MEC Co., Ltd., Tokyo, Japan

[21] Appl. No.: 09/264,819

[22] Filed: Mar. 9, 1999

[51] Int. Cl.[7] .................................................. G03B 1/04
[52] U.S. Cl. .................................. 242/354.1; 242/354.2; 242/356; 360/96.2; 360/96.3
[58] Field of Search ................................ 242/354.1, 354.2, 242/356; 360/96.3, 96.2

[56] References Cited

U.S. PATENT DOCUMENTS

| | | | |
|---|---|---|---|
| 3,533,633 | 10/1970 | Wilder | 242/354.1 X |
| 3,684,209 | 8/1972 | Wada | 242/354.1 X |
| 3,869,723 | 3/1975 | Yoshida | 360/96.2 |
| 4,159,492 | 6/1979 | Ban et al. | 242/354.1 X |
| 4,935,831 | 6/1990 | Shimbo | 360/105 |
| 5,276,567 | 1/1994 | Ohashi et al. | 360/96.2 X |
| 5,450,275 | 9/1995 | Kunze et al. | 360/96.3 |
| 5,452,160 | 9/1995 | Sakuma et al. | 360/96.3 X |
| 5,765,741 | 6/1998 | Kunze et al. | 242/354.1 X |
| 5,798,900 | 8/1998 | Shimbo | 360/137 |
| 5,816,521 | 10/1998 | Kunze et al. | 242/356 |

FOREIGN PATENT DOCUMENTS

0 047 552  3/1982  European Pat. Off. ............. 242/356

*Primary Examiner*—Donald P. Walsh
*Assistant Examiner*—Minh-Chau Pham
*Attorney, Agent, or Firm*—Greenblum & Bernstein, P.L.C.

[57] ABSTRACT

An autoreverse mechanism for a tape recorder having two fly-wheels and two pinch rollers for winding a tape in forward and reverse directions comprises a head mount plate designed in such a way that when the head mount plate moves toward a reproducing/recording position from a stop position and is locked there, the head mount plate moves while being inclined upper rightward or upper leftward, and is locked, and the two pinch rollers are separately pressed against the respective fly-wheels by using that inclination, thereby winding the tape.

5 Claims, 9 Drawing Sheets

AUTOREVERSE MECHANISM

BACKGROUND OF THE INVENTION

1. Field of the Invention

The present invention relates to an autoreverse mechanism in a cassette tape recorder, which is designed to ensure the autoreverse function by a simple manipulation and a simple structure of adding minimum parts to a conventional unidirectional playback mechanism in a forward-reverse switching mechanism.

2. Description of the Related Art

A conventional autoreverse mechanism of such a type has a pinch-roller presser fitting and a compression spring mounted on a head mount plate in a slidable manner, and has pinch rollers provided in the respective pinch frames, whereby when the presser fitting and compression spring slide rightward, the right pinch frame is pushed up and the right pinch roller is pressed against the right fly-wheel, and when the presser fitting and compression spring slide leftward, the left pinch frame is pushed up and the left pinch roller is pressed against the left fly-wheel, thereby winding the tape.

The conventional autoreverse mechanism has many components that lead to a large overall size, which stands in the way of making the mechanism smaller. In addition, the conventional autoreverse mechanism suffers a complicated operation, lacks the stability, and has a difficulty in reducing the cost.

SUMMARY OF THE INVENTION

Accordingly, it is an object of the present invention to provide an improved autoreverse mechanism which can overcome the conventional problems.

To achieve the above object, according to this invention, there is provided an autoreverse mechanism for a tape recorder having two fly-wheels and two pinch rollers for winding a tape in forward and reverse directions, which mechanism comprises a head mount plate designed in such a way that when the head mount plate moves toward a reproducing/recording position from a stop position and is locked there, the head mount plate moves while being inclined upper rightward or upper leftward, and is locked, and the two pinch rollers are separately pressed against the respective fly-wheels by using that inclination, thereby winding the tape.

According to the autoreverse mechanism of the invention for a tape recorder having two fly-wheels and two pinch rollers for winding a tape in forward and reverse directions, a forked guide groove for retaining a select boss is formed in the body plate, one end of the select boss is placed in the guide groove, and a head mount plate is provided with a deformed hole where the other end of the select boss is fitted, whereby when the head mount plate moves forward, the select boss moves forward along one of two forked portions of the guide groove which is selected depending on the position of the select boss, and the head mount plate, guided by the select boss, moves forward while being inclined upper rightward or upper leftward. With the head mount plate being inclined upper rightward, only the right pinch roller is pressed against the right fly-wheel, thereby winding the tape in the forward direction. With the head mount plate being inclined upper leftward, only the left pinch roller is pressed against the left fly-wheel, thereby winding the tape in the reverse direction.

DETAILED DESCRIPTION OF THE PREFERRED EMBODIMENT

A preferred embodiment of the present invention will now be described with reference to the accompanying drawings. Reference numeral "1" denotes a body plate, and reference numeral "2" denotes a motor. A small-diameter pulley 3 is attached to the same shaft $2_1$ of the motor 2. Reference numeral "4" is a fly-wheel. A main belt 5 is put around the small-diameter pulley 3 of the motor 2 and the fly-wheel 4. A small-diameter pulley 6 is attached to the same shaft $4_1$ of the fly-wheel 4. Reference numeral "7" is a center pulley. A sub belt 8 is put around the small-diameter pulley 6 of the fly-wheel 4 and the center pulley 7. Reference numeral "9" is a center pulley gear attached to the same shaft $7_1$ of the center pulley 7, and reference numeral "10" is a rotation transmission gear which engages with the center pulley gear 9. Reference numeral "11" denotes a plastic arm member whose base is rotatably attached to the same shaft $7_1$ of the center pulley 7. A fork-shaped elastic holder $11_1$ is formed at the distal end of the arm member 11. This fork-shaped elastic holder $11_1$ holds the outer surface of a large-diameter boss 13 of the rotary shaft, 12, of the rotation transmission gear 10 while pressing that outer surface, thereby applying a load to the rotation transmission gear 10. A protrusion $11_2$ is formed on the other end of the arm member 11 on the opposite side to the holder $11_1$.

A head mount plate 14 has a deformed hole 14 formed in its distal end portion. Reference numeral "15" is a forked guide groove formed in the body plate. Reference numeral "16" is a select boss whose protrusion $16_1$ is to be retained in the guide groove 15 and to be engaged with the protrusion $11_2$.

Reference numeral "17" is a gear on the play-reel base side, and reference numeral "18" is a gear on the rewind-reel base side. Those gears 17 and 18 come to engagement with the rotation transmission gear 10 or disengage from the gear 10 in accordance with the rotation of the plastic arm member 11. A play arm 19 is mounted so as to be rotatable by a shaft 20. Reference numeral "21" denotes a pinch roller and reference numeral "22" denotes a portion which restricts the pinch roller 21.

Specific Operational Examples

Specific operational examples of this tape autoreverse mechanism will now be discussed. The forward torque of the motor 2 is transmitted to the fly-wheel 4 by the main belt 5.

Then, the rotation of the fly-wheel 4 is transmitted to the center pulley 7 via the sub belt 8. At the same time, the rotation transmission gear 10 in engagement with the gear 9 of the center pulley 7 rotates. At this time, the rotation transmission gear 10 is attached to the plastic arm member 11 rotatable about the center pulley shaft $7_1$, and is applied with a load by the rotary arm member 11 which holds the large-diameter boss 13 of the shaft 12 of the gear 10.

When the rotation of the gear 9 of the center pulley 7 acts to rotate the rotation transmission gear 10, the rotation transmission gear 10 rotates about the center pulley shaft $7_1$ together with the rotary arm member 11.

At this time, the protrusion $11_2$ of the arm member 11 pushes the protrusion $16_1$ of the select boss 16 leftward, causing the select boss 16 to move leftward in the forked guide groove 15 of the body plate 1.

The other protrusion, $11_3$, of the arm member 11 kicks up the distal end portion, $19_1$, of the play arm 19, which in turn rotates about the shaft 20. Consequently, a protrusion $19_2$ provided on the play arm 19 pushes the head mount plate 14 upward so that the head mount plate 14 moves to a predetermined position.

At this time, another protrusion $16_2$ of the select boss 16 is fitted in the deformed hole $14_1$ of the head mount plate 14, so that when the head mount plate 14 moves forward, the head mount plate 14 moves, together with the select boss 16, along the left groove portion of the forked guide groove 15. The head mount plate 14 is guided and inclined by the select boss 16, so that the head mount plate 14 moves forward while being inclined upper rightward.

Figure 1:
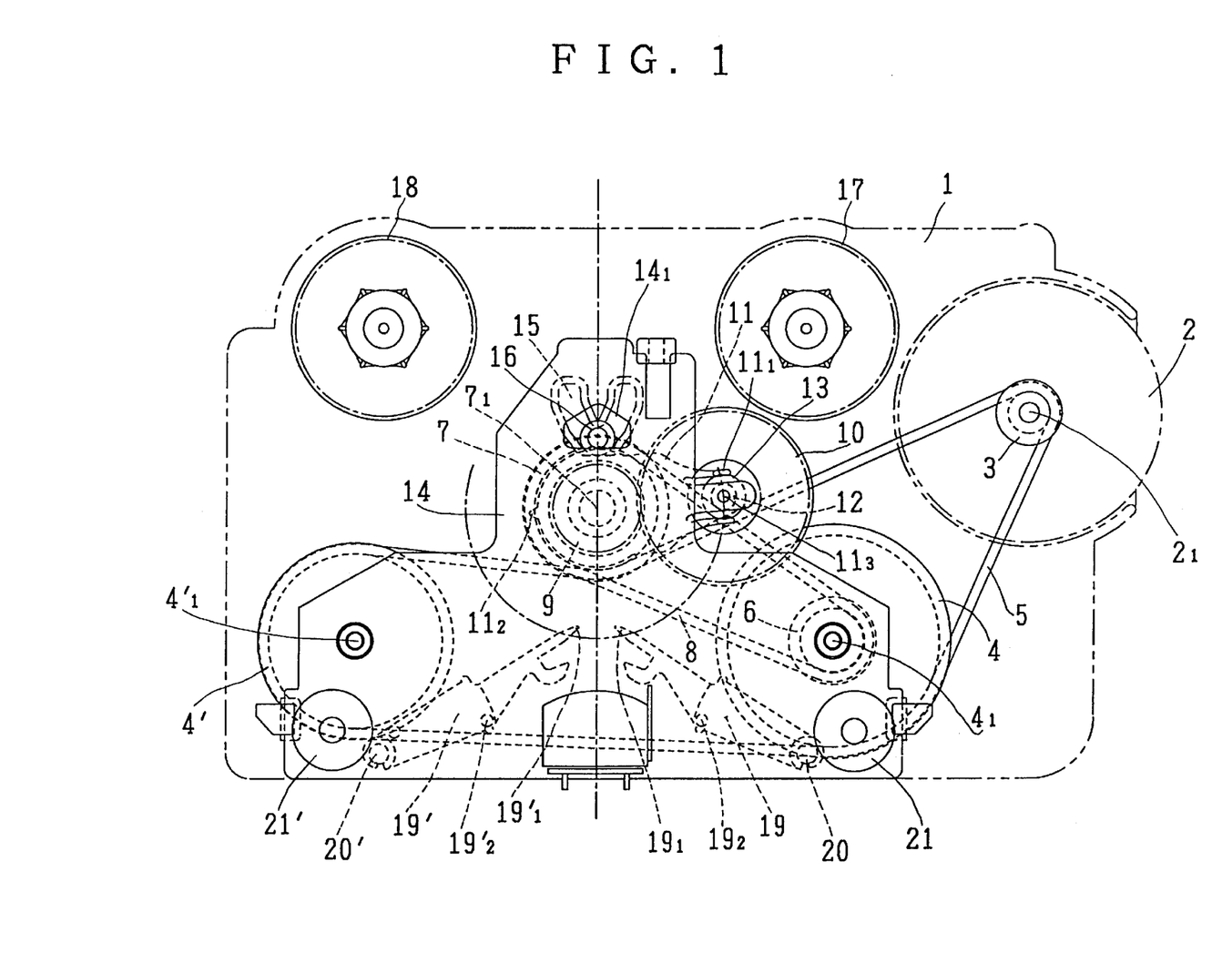
FIG. 1 is a plan view illustrating the essential portions of a tape recorder equipped with an autoreverse mechanism according to this invention.
Figure 2:
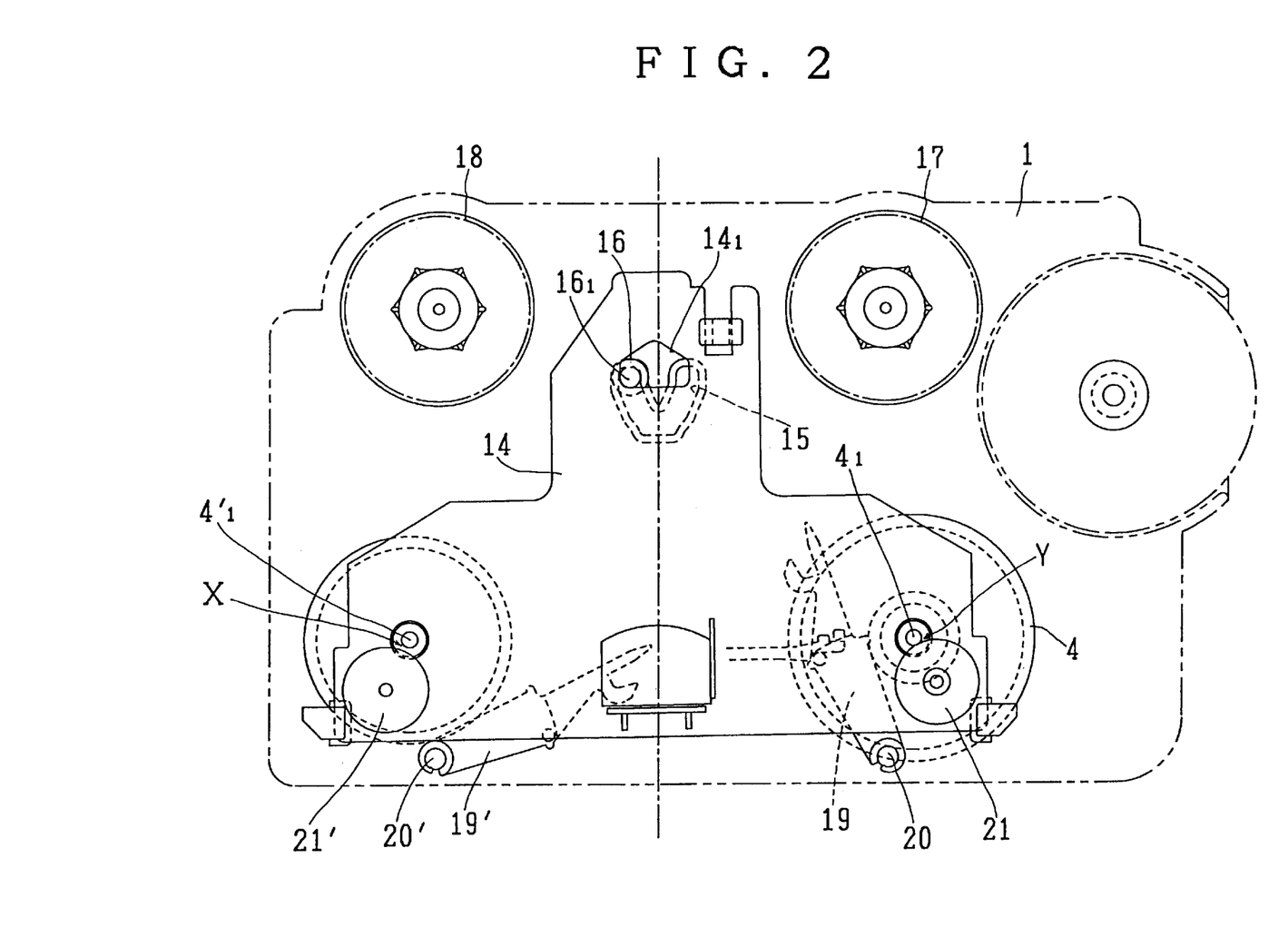
FIG. 2 is a plan view showing a head mount plate in FIG. 1 being inclined upper rightward.
Figure 3:
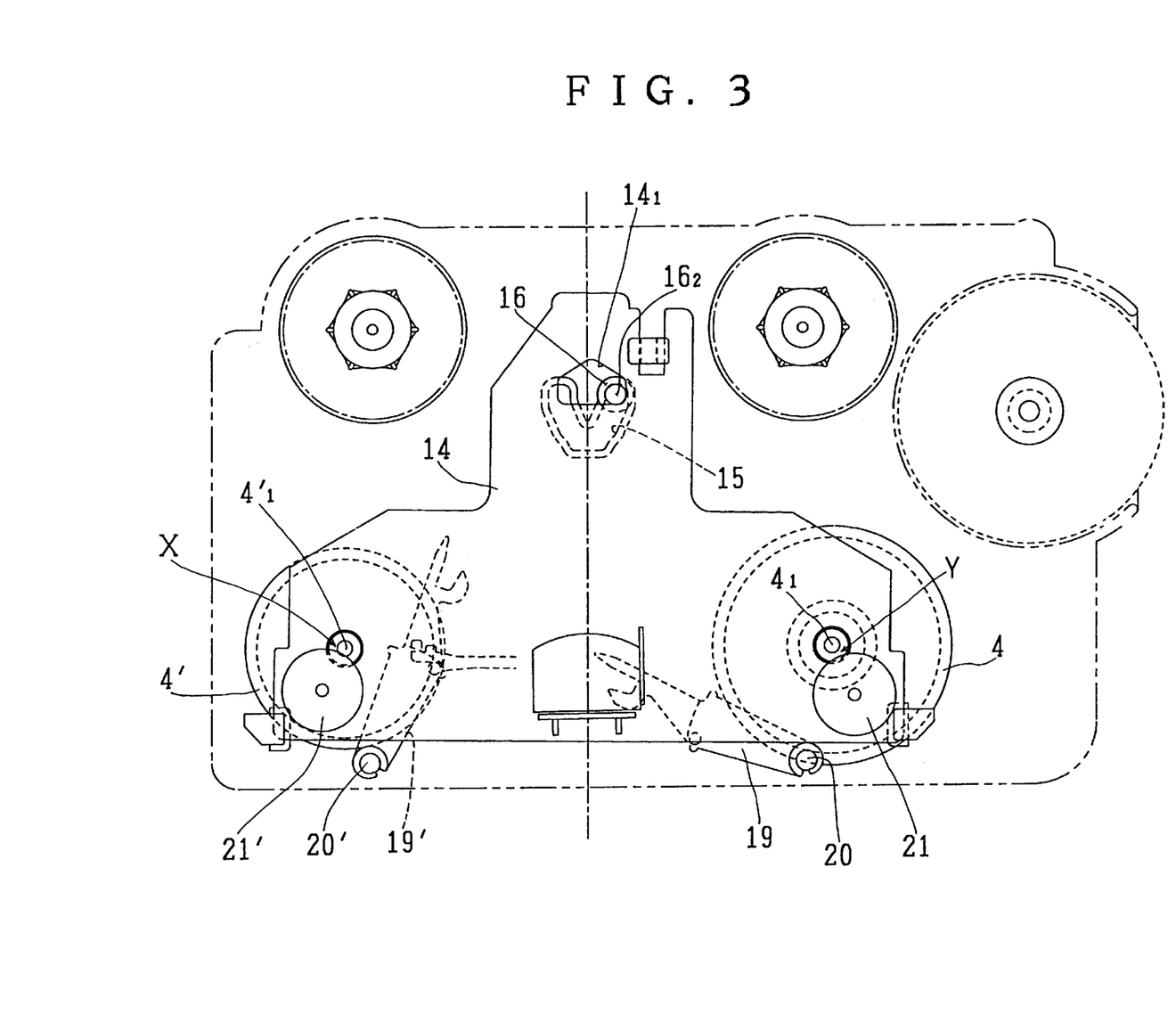
FIG. 3 is a plan view showing the head mount plate in FIG. 1 being inclined upper leftward.
Figure 4:
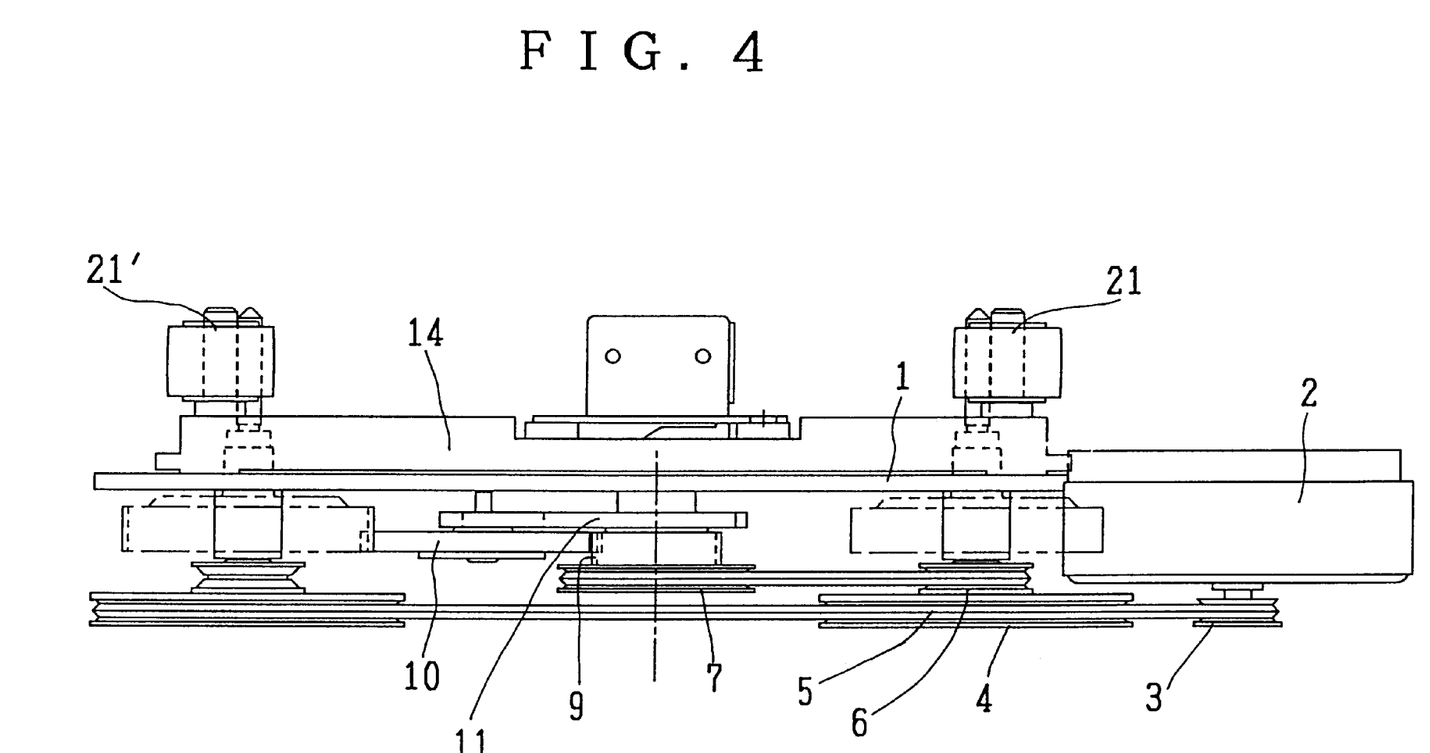
FIG. 4 is a side view depicting a rotation transmission path.
Figure 5:
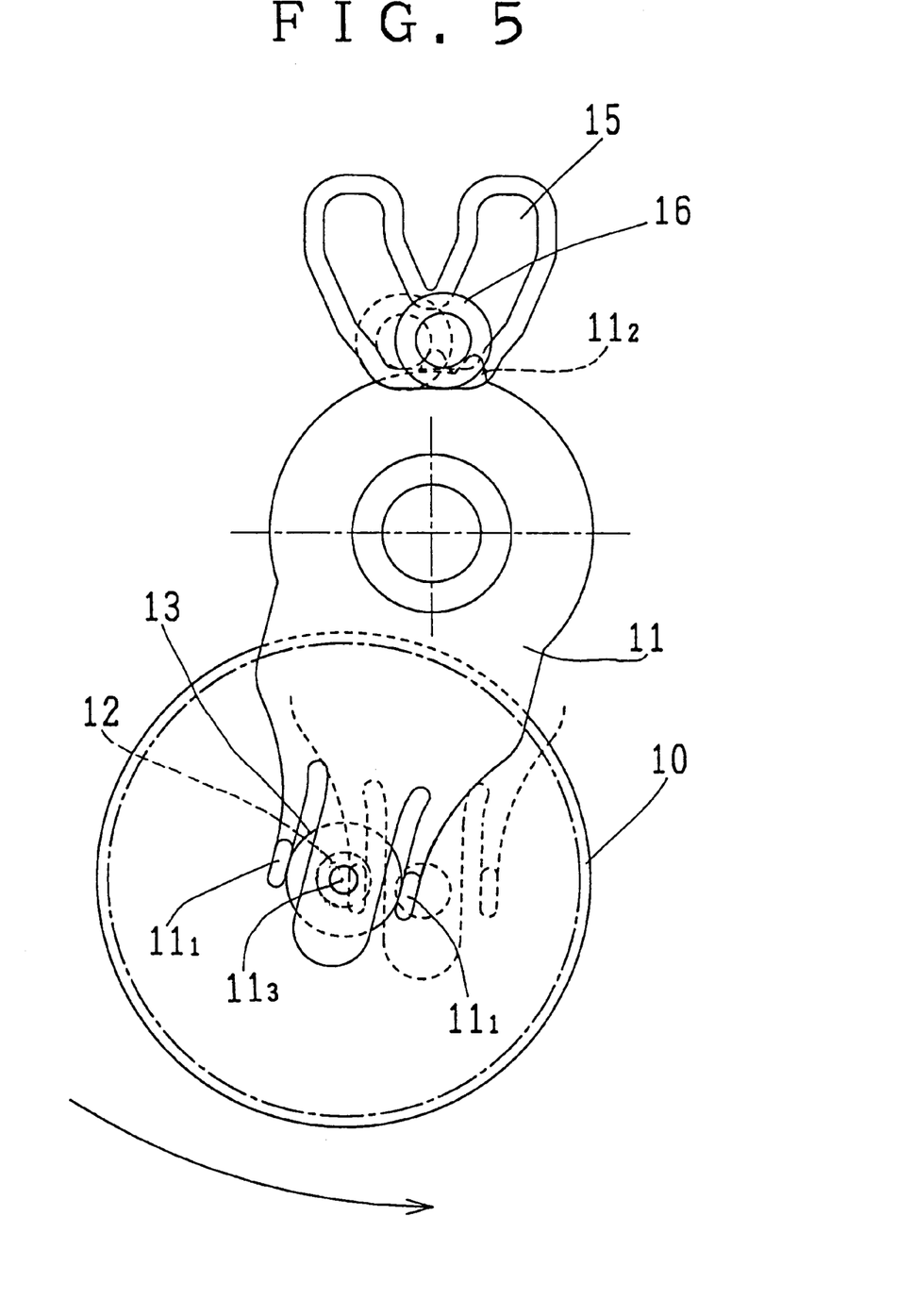
FIG. 5 is a plan view illustrating the stop-to-forward-play actions of a rotation transmission gear and a rotary arm portion.
Figure 6:
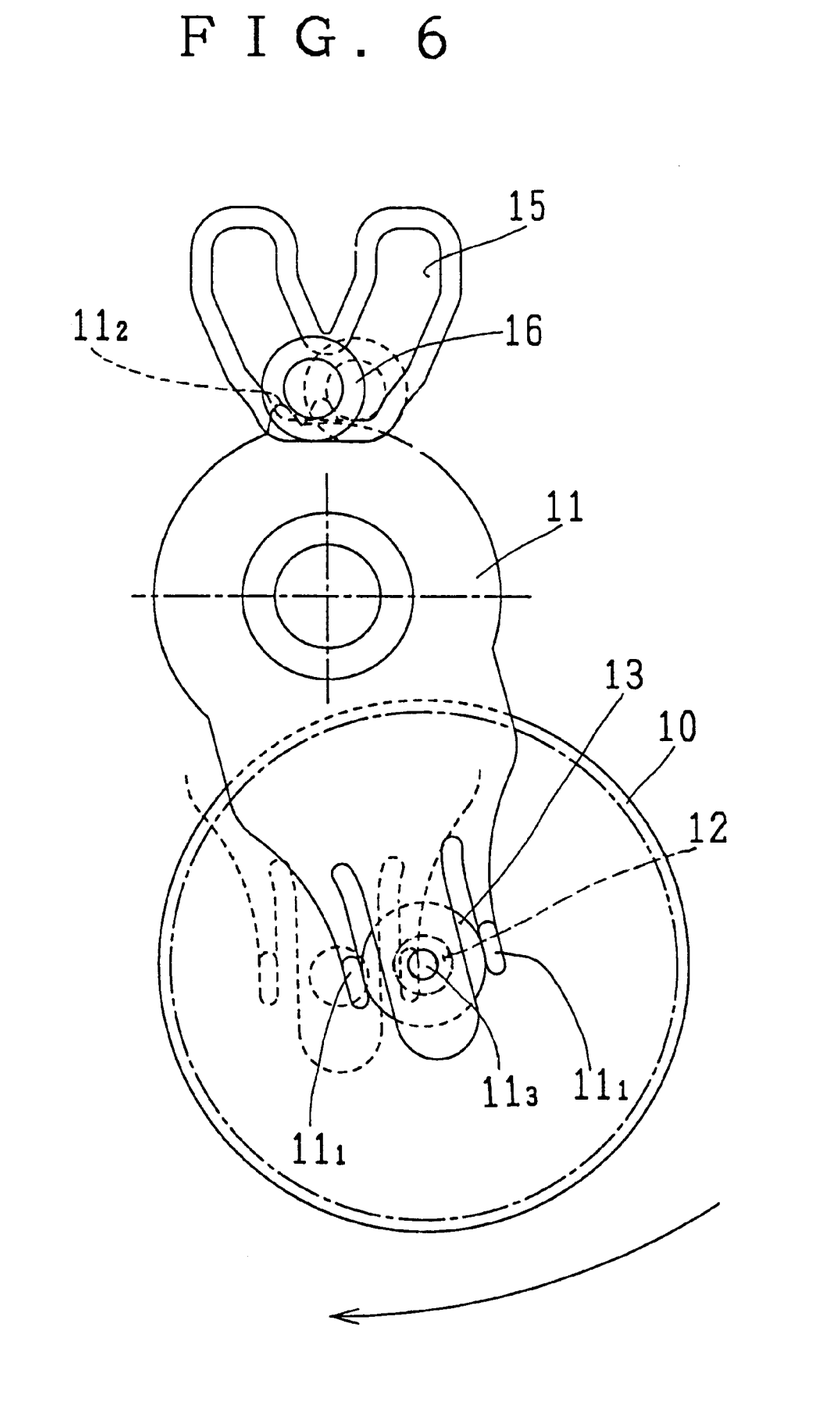
FIG. 6 is a plan view illustrating the stop-to-rewind actions of the rotation transmission gear and the rotary arm portion.
Figure 7:
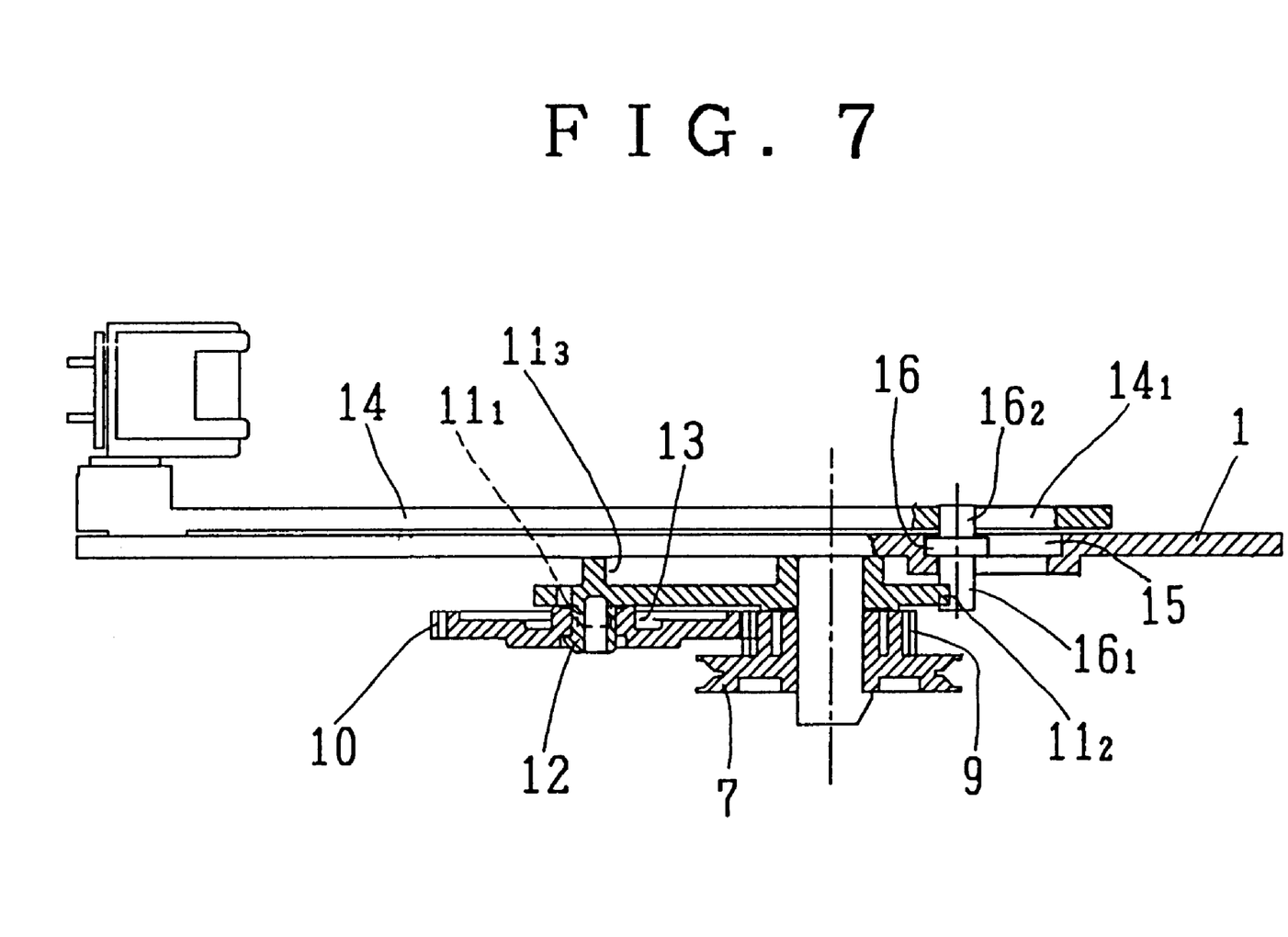
FIG. 7 is a side view showing how a select boss to be guided to a guide groove is engaged with the rotary arm.
Figure 8:
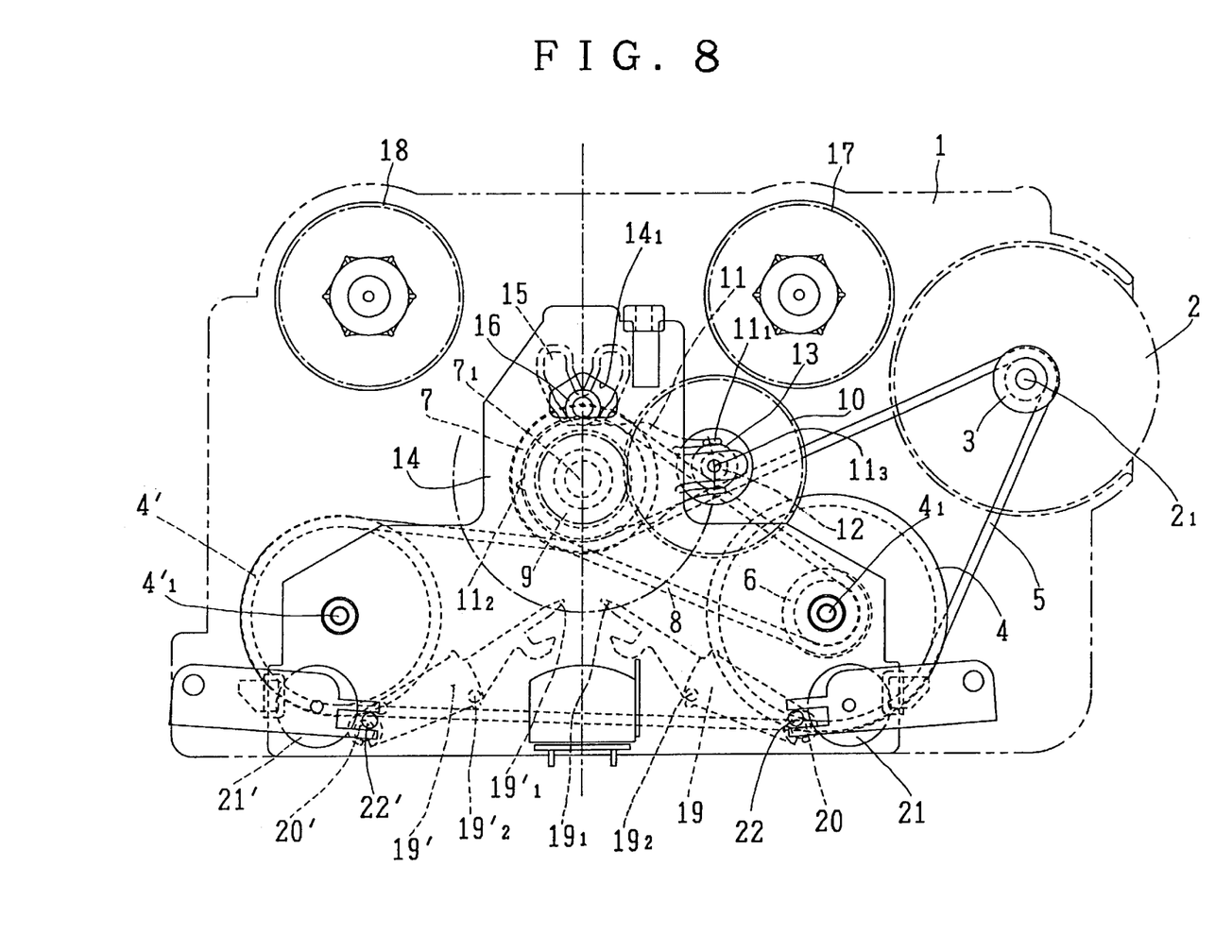
FIG. 8 is a plan view showing the head mount plate with a portion for restricting a pinch roller in a stop state.
Figure 9:
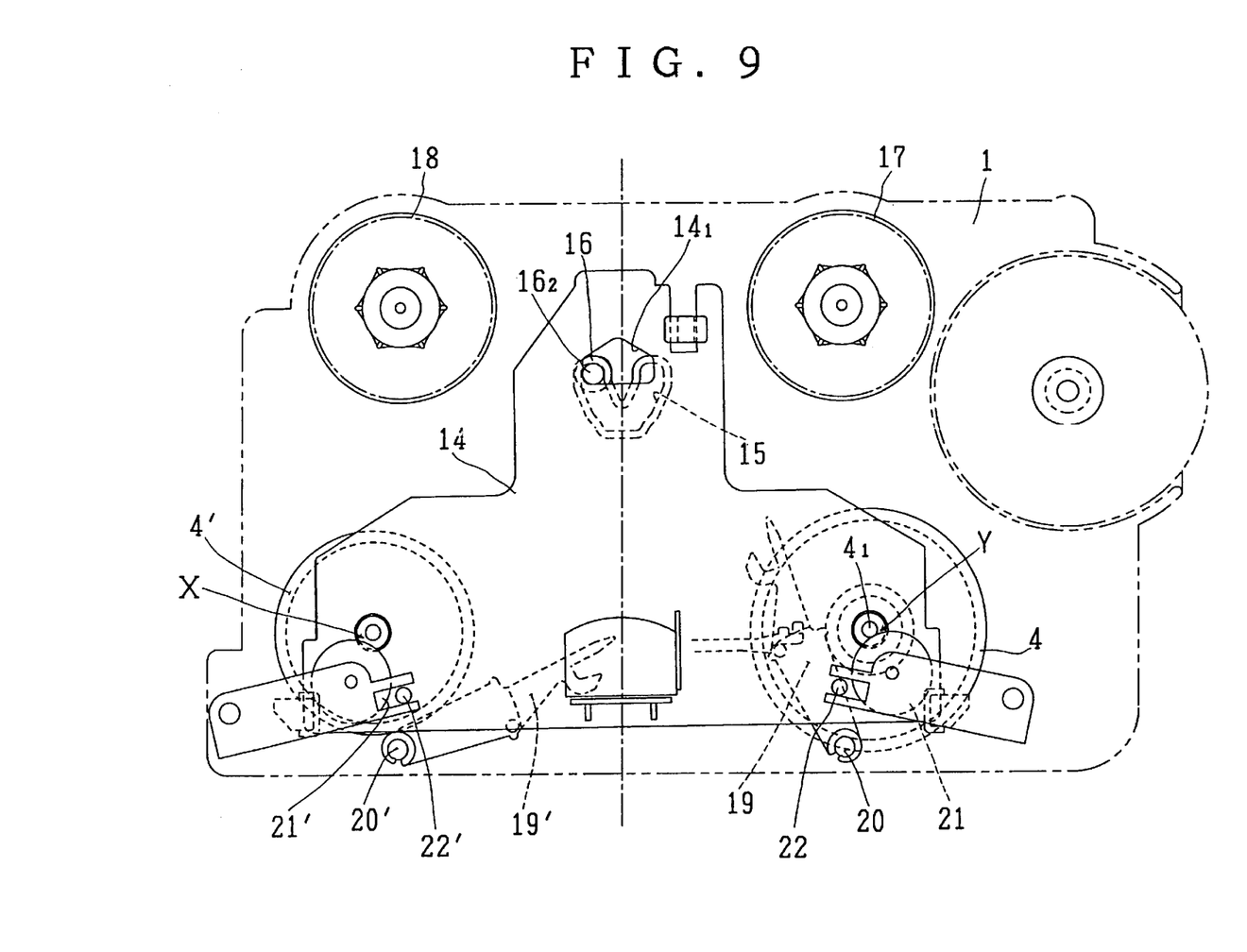
FIG. 9 is a plan view showing the head mount plate with the pinch-roller restricting portion in a forward state.

The pinch rollers 21 and 21' or the portions for restricting the pinch rollers are provided on the right and left portions of the head mount plate 14. As the head mount plate 14 moves forward while being inclined upper rightward, therefore, the right pinch roller 21 is pressed against the right fly-wheel shaft 4' (a portion Y in FIG. 2), with a clearance (a portion X in FIG. 2) between the left pinch roller 21' and the left fly-wheel shaft 4'. This causes the tape to be wound in the forward direction.

In a case of reverse driving of the motor 2, the reverse torque of the motor 2 is transmitted to the fly-wheel 4 by the main belt 5. Then, the rotation of the fly-wheel 4 is transmitted to the center pulley 7 via the sub belt 8. At the same time, the rotation transmission gear 10 in engagement with the gear 9 of the center pulley 7 rotates in the reverse direction. At this time, the rotation transmission gear 10 is applied with a load by the rotary arm member 11 which holds the large-diameter boss 13 of the shaft 12 of the gear 10.

When the rotation of the gear 9 of the center pulley 7 acts to rotate the rotation transmission gear 10, the rotation transmission gear 10 rotates about the center pulley shaft $7_1$ together with the rotary arm member 11.

At this time, the protrusion $11_2$ of the arm member 11 pushes the protrusion $16_1$ of the select boss 16 rightward, and the forward movement of the head mount plate 14 causes the protrusion $16_1$ of the select boss 16 to move rightward in the forked guide groove 15, tilting the head mount plate 14 upper leftward. As a result, the tape is wound up in the rewinding direction.

With the above-described structure, this invention accomplishes switching between the forward and reverse movements or an autoreverse mechanism with a very small number of parts. It is therefore possible to make the autoreverse mechanism smaller with a simple structure and an easy operation, and to reduce the cost.

What is claimed is:

1. An autoreverse mechanism for a tape recorder having two fly-wheels and two pinch rollers for winding a tape in forward and reverse directions, said mechanism comprising:

a head mount plate configured so that said head mount plate translates and rotates toward a first reproducing/recording position, inclined in a first direction, from a stop position and is locked there, and said head mount plate translates and rotates toward a second reproducing/recording position, inclined in a second direction, from a stop position and is locked there, and one of said two pinch rollers is separately pressed against one of said two fly-wheels when said head mount plate is inclined in said first direction, thereby winding said tape in the forward direction, and the other of said two pinch rollers is separately pressed against the other of said two fly-wheels when said head mount plate is inclined in said other direction, thereby winding said tape in the reverse direction.

2. The autoreverse mechanism as recited in claim 1, further comprising a body plate on which said head mount plate is mounted for translation and rotation, said head mount plate provided with a guide groove;

a select boss mounted for sliding movement within said guide groove, said select boss including a protrusion; and said head mount plate includes a deformed hole;

wherein said protrusion on said boss movably engages within said deformed hole of said head mount plate, and said guide groove, said boss and said deformed hole cooperate to define the translational and rotational movement of said head mount plate.

3. The autoreverse mechanism as recited in claim 2, wherein said guide groove is forked.

4. The autoreverse mechanism as recited in claim 3, wherein said guide groove is configured to have a generally V-shape.

5. The autoreverse mechanism as recited in claim 2, further comprising a rotary arm member rotatably mounted on said body plate, said rotary arm including a protrusion that selectively engages said protrusion on said boss to control movement thereof within said guide groove.

\* \* \* \* \*